(12) United States Patent
Yamamoto (10) Patent No.: US 6,408,148 B1
(45) Date of Patent: Jun. 18, 2002

(54) IMAGE PROCESSING APPARATUS, IMAGE RECORDING APPARATUS, CONTROLLING METHOD FOR THESE APPARATUSES, AND POWER SUPPLY APPARATUS USED THEREIN

(75) Inventor: Kazuma Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,689

(22) Filed: May 12, 2000

(30) Foreign Application Priority Data

May 17, 1999 (JP) .......................... 11-136316
Jun. 18, 1999 (JP) .......................... 11-172632

(51) Int. Cl.[7] .................. B41L 39/00; G03G 15/00; H01F 29/00
(52) U.S. Cl. .................. 399/88; 219/216; 307/139; 399/37; 399/70
(58) Field of Search ............... 399/37, 68, 70, 399/88; 219/216; 323/282; 307/38, 139, 140

(56) References Cited

U.S. PATENT DOCUMENTS 4,627,714 A * 12/1986 Nozaki ..................... 399/70
5,231,423 A    7/1993 Wataya et al. ............ 347/18
5,270,738 A   12/1993 Takahashi et al. ......... 347/24
5,734,391 A    3/1998 Tanaka et al. ............ 347/14
5,949,443 A    9/1999 Yamamoto et al. .......... 347/3
5,995,397 A * 11/1999 Kim ..................... 399/88 X
6,177,739 B1 * 1/2001 Matsudaira et al. ...... 399/88 X

* cited by examiner

Primary Examiner—Sophia S. Chen
(74) Attorney, Agent, or Firm—Fitzpatrick, Cella Harper & Scinto

(57) ABSTRACT

An apparatus having a power supply section capable of outputting plural power supply voltages is provided with a sleep mode (energy-saving mode) for inhibiting at least one of the outputs from the power supply section in a wait state. Furthermore, an image forming apparatus such a printer is provided with a cut-off function for inhibiting at least one of the outputs from the power supply section supplied to a heater of a fixing device if an abnormality is detected, so that by relating the operation of this cut-off function and the operation of inhibiting at least one output at the power supply section to each other, these operations may be more easily controlled and also the number of components required can be reached.

20 Claims, 9 Drawing Sheets

IMAGE PROCESSING APPARATUS, IMAGE RECORDING APPARATUS, CONTROLLING METHOD FOR THESE APPARATUSES, AND POWER SUPPLY APPARATUS USED THEREIN

BACKGROUND OF THE INVENTION

1. Field of the Invention

The present invention relates to an image processing apparatus, an image recording apparatus, a method for controlling the same, and a power supply apparatus used therein.

2. Related Background Art

Presently, in general, an image recording apparatus such as a printer indispensably requires a dual-output power supply which combines a large-capacity engine driving power supply (e.g., of 24V) for use in a steady operation and a small-capacity engine controlling power supply (e.g., of 3.3V).

Recently, in particular, there have been developed various technologies for saving energy in a wait state in a specific attempt to save on power in a wait state (during sleeping) in which the engine driving power supply is not necessary.

Figure 1:
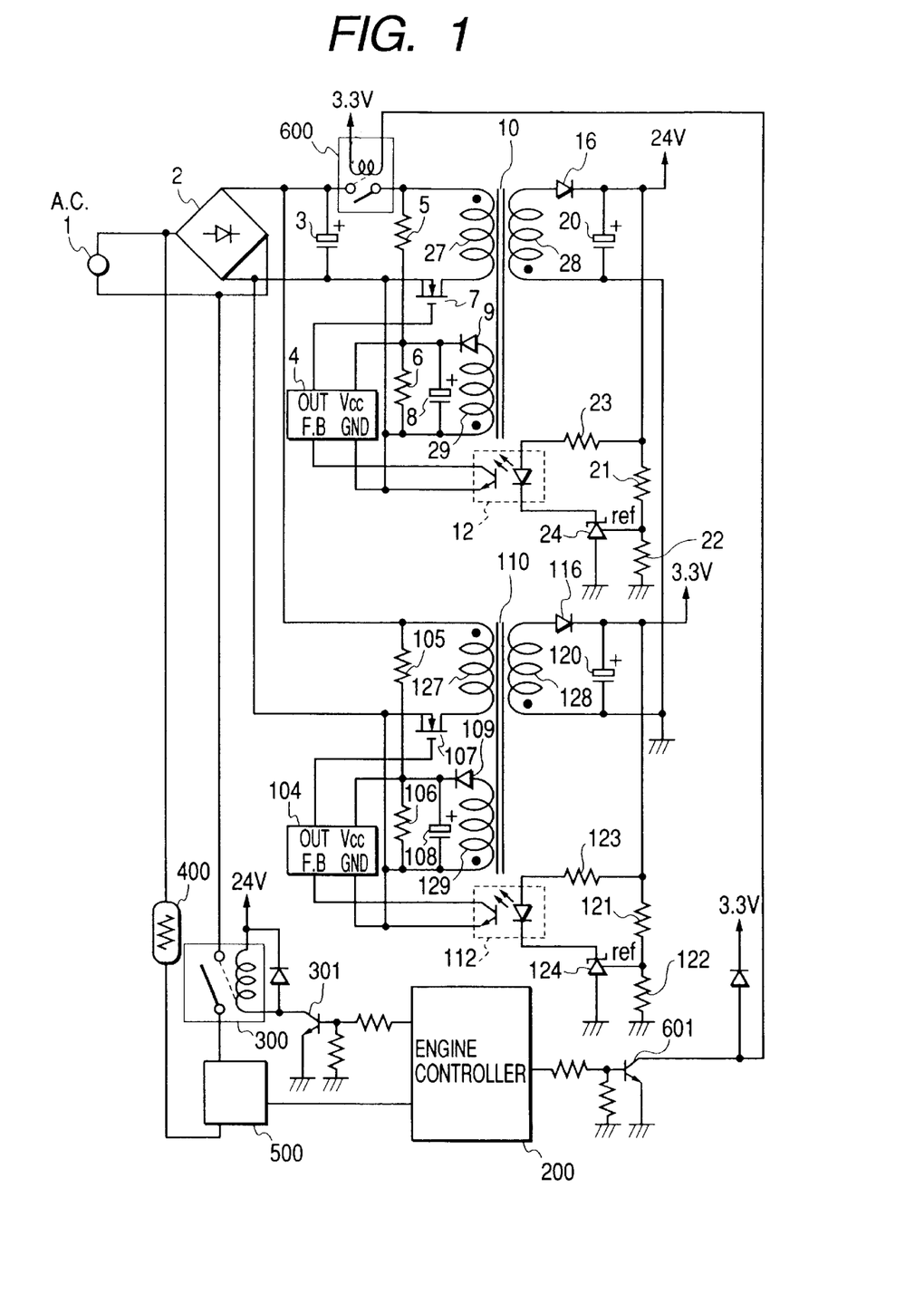
FIG. 1 is a circuit diagram showing a configuration of a power supply system of a general electrophotographic type of an image recording apparatus.

FIG. 1 is a circuit diagram showing one example of a configuration of a power supply system for an electrophotographic image recording apparatus by the present inventor. In this drawing, a reference numeral 1 indicates a commercial AC power supply, an alternating current from which is rectified by a diode-bridge 2, a direct current from which is in turn smoothed by a capacitor 3 and then supplied to two converters.

That is, reference numerals 10 and 110 indicate respective transformers of these converters, being provided with primary windings 27 and 127, secondary windings 28 and 128, and control windings 29 and 129, respectively, in such a configuration that the primary windings 27 and 127 have switching-element MOSFET's 7 and 107 connected thereto, respectively. On the side of the primary winding of the converter, reference numerals 4 and 104 indicate driving circuits comprised of controlling IC's for turning the respective FET's 7 and 107 ON and OFF and reference numerals 5 and 105, the respective resistors. On the side of the secondary winding of the converter, reference numerals 16 and 116 indicate rectifying diodes and reference numerals 20 and 120, smoothing capacitors, in such a configuration that one of the two converters which is installed at the upper stage feeds out +24V DC voltage and the other converter at the lower state, +3.3V DC voltage.

The controlling windings 29 and 129 for the converters have connected thereto rectifying diodes 9 and 109, smoothing capacitors 8 and 108, and resistors 6 and 106 respectively, thus supplying their DC outputs (Vcc) to driving circuits 4 and 104 respectively. The driving circuits 4 and 104 also have connected thereto photo-transistors of photo-couplers 12 and 112 respectively, in such a configuration that the anodes of light emitting diodes of the photo-couplers 12 and 112 are connected via resistors 23 and 123 to output terminals of the primary winding respectively, while the cathodes have constant-voltage diodes 24 and 124 respectively, gates of which are supplied with outputs (ref) of the secondary side output voltage divided by resistors 21 and 22 and resistors 121 and 122 respectively.

In FIG. 1 again, a reference numeral 200 indicates an engine controller for the image recording apparatus and a reference numeral 300 indicates a relay for cutting off the power supply, a relay coil of which is connected with a transistor 301 controlled by the engine controller and a relay contact of which is connected to a heating means 400 of a fixing device and also between a triode AC switch (triac) and the commercial power supply. A reference numeral 600 indicates a relay for cutting the power supply, a relay contact of which is disposed on a DC power supply input line on the primary winding side of the upper stage converter and a relay coil of which is connected to a transistor 601 controlled by the engine controller 200.

In the circuit of the above-described configuration, if the heating means 400 or the triac 500 fails, the relay 300 acts to prevent the AC power supply from being applied to the heating means 400. In such a case, the engine controller 200 turns the transistor 301 ON and OFF to open and close the relay 300. The engine controller 200 also drives and controls the printer engine, the heater driving circuit for controlling a quantity of electrification through the heater of the heating means, and the relays 300 and 600.

The relay 600 acts to cut off power to the 24V power supply, while the engine controller 200, in a constant lapse of time after the relevant printer terminates printing and enters the wait state, turns OFF the transistor 601 in order to open the relay 600, thus cutting off power to the 24V power supply. To restart actual printing, that controller turns ON the transistor 601 to close the relay 600, thus supplying power to the 24V power supply.

With such a configuration, the relay 600 can be opened in the wait (sleep) state to cut off power supplied to the 24V power supply, thus saving on power in that state.

An image recording apparatus which employs the above-described power-supply circuit has many circuit components used for cutting the power supply, which leads to such problems of an increased cost, an expanded packaging surface, and an enlarged apparatus.

There may also be such a method of, in the sleep state, changing an oscillation frequency to permit the power supply to engage in blocking oscillation, in order to lower the voltage level of the driving power supply, thus reducing the loss of energy required.

An example of such control method of blocking oscillation is described below with reference to FIGS. 2 and 3.

Figure 2:
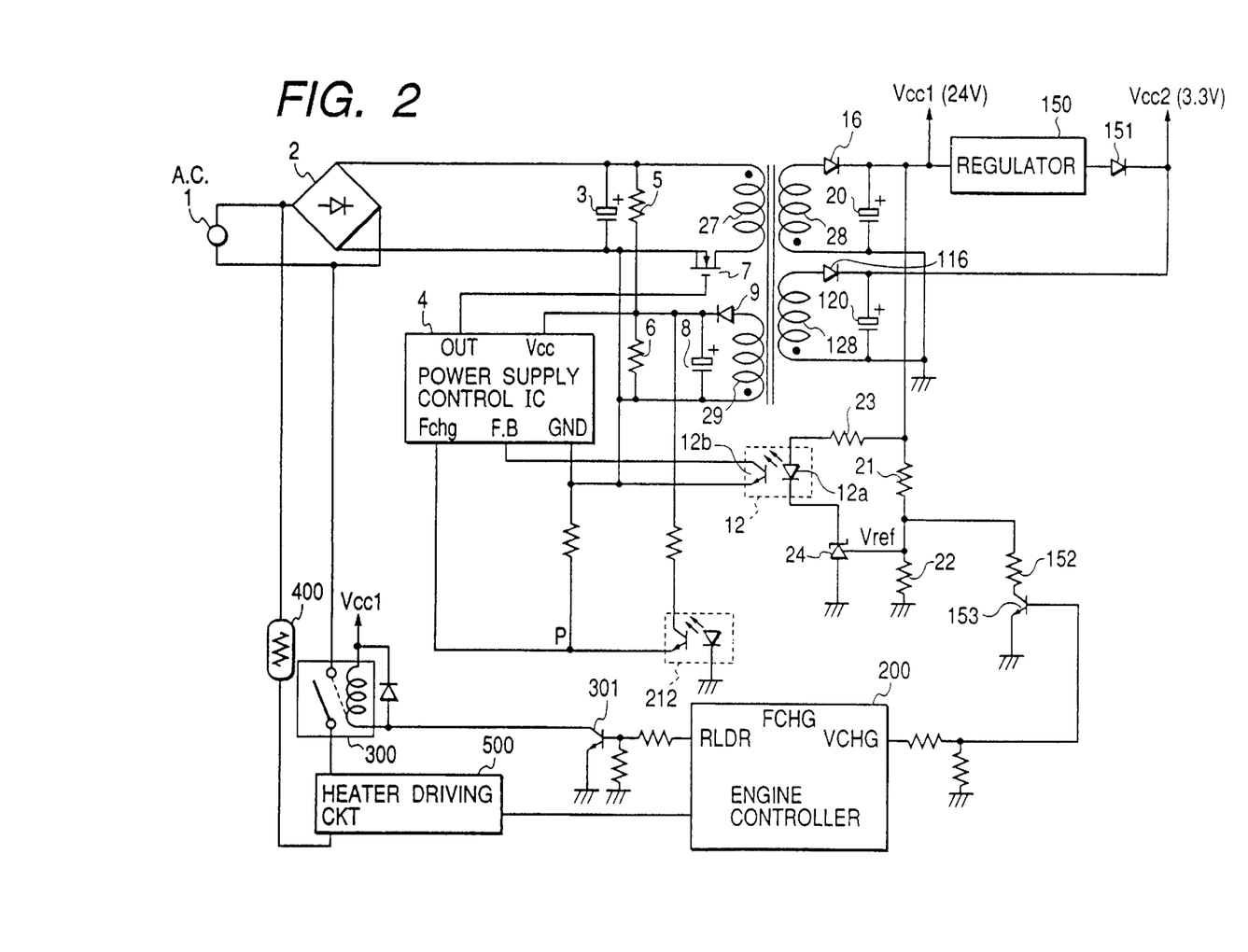
FIG. 2 is a circuit diagram showing a configuration example of a power supply apparatus equipped to a printer.

FIG. 2 shows an example of a circuit configuration of a power supply apparatus by the present inventor for a printer etc. Note here that the same reference numbers indicate the same parts in FIGS. 1 and 2.

The reference number 200 indicates the engine controller, which drives the printer engine, controls the engine, the heater driving circuit for controlling a quantity of electrification through the heater, and the relays.

This engine controller 200 is provided with three ports of an RLDR port connected to a cutting-off control circuit for the relay 300, an FCHG port connected to a frequency control circuit for a power supply control IC 4, and a VCHG port connected to a power-supply voltage control circuit.

The engine controller 200 sets the RLDR port High and Low to turn the transistor 301 ON and OFF, thus opening and closing the relay 300.

A reference numeral 212 indicates a photo-coupler for transmitting a signal generated from the FCHG port of the engine controller 200 to the power-supply control IC 4, thus changing for a frequency of the power-supply control IC 4. Furthermore, to obtain a 3.3V output Vcc2 from the 24V output Vcc1, three-terminal regulators 150 and 151 are provided, as well as a resistor 152 and a transistor 153 for switching Vref.

(Sleep state)

The following will describe operations in the sleep state.

When the printer terminates printing, the engine controller 200 sets the FCHG port Low, thus cutting off a current flowing through the photo-coupler 212 in a constant lapse of time (in the sleep state). With this, the FCHG port of the power-supply control IC 4 is connected to GND via a point P.

Figure 3:
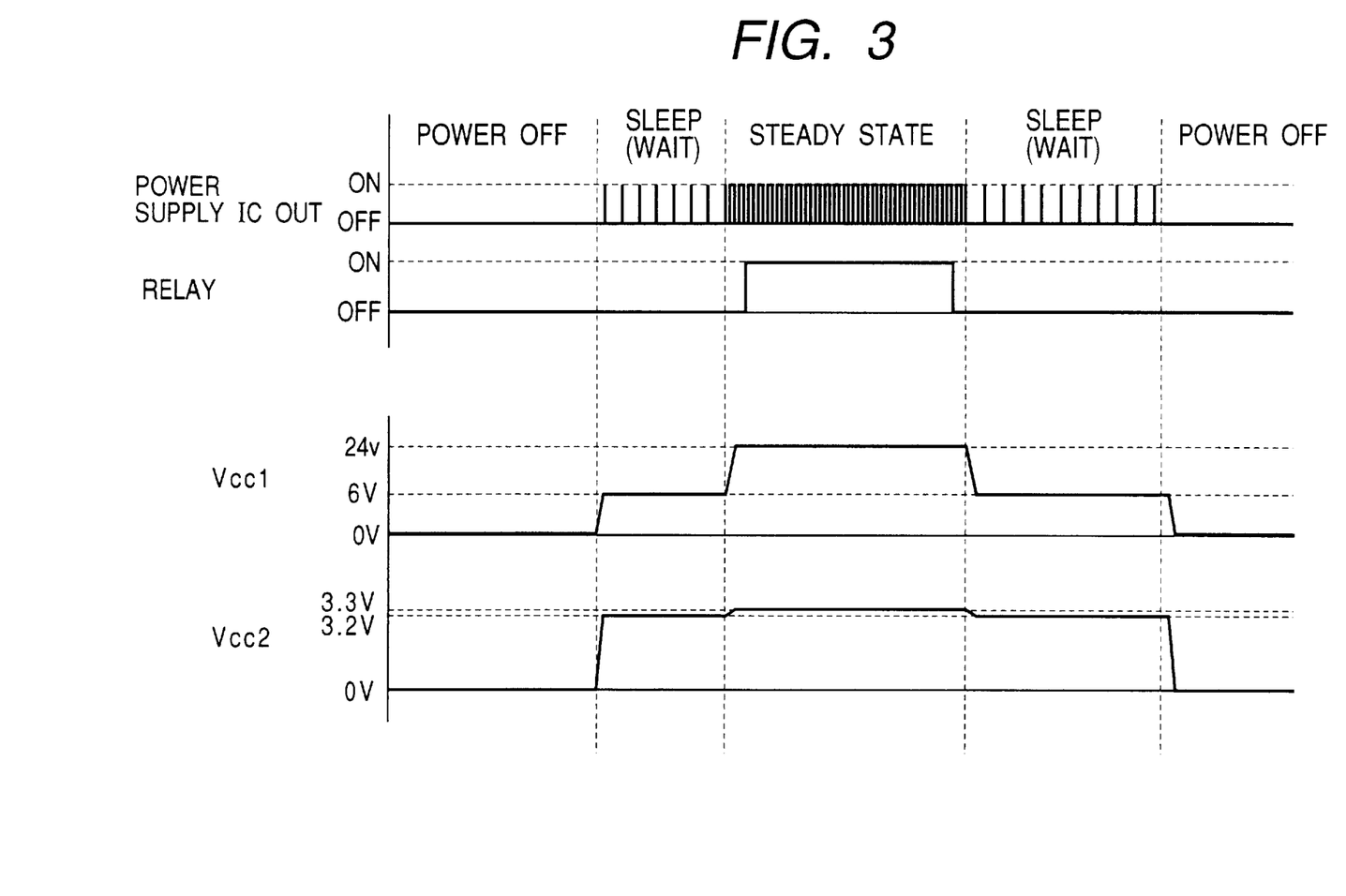
FIG. 3 is a timing chart explaining operation timing in a sleep state and a steady state of the power supply apparatus of FIG. 2.

In this sleep state, as shown in FIG. 3, the oscillation frequency of the power-supply control IC 4 is decreased, thus reducing a switching loss of the power supply.

Furthermore, the engine controller 200 sets the VCHG port Low to turn OFF the transistor 153, thus cutting off electrification to the resistor 152. With this, the power supply is controlled such that a voltage obtained by dividing a Vcc1 voltage with feedback resistors 21 and 22 may be equal to a reference voltage of a shunt regulator 24.

When a current flows at the light emitting section of the photo-coupler 12, the light emitting section is turned ON to permit the current to flow out of the F.B section of the power-supply control IC 4. In response to this current, the power-supply control IC 4 controls its own duty ratio, thus stabilizing power supply.

In such a sleep state, the voltage Vcc1 becomes about 6V. At the same time, the voltage Vcc2 generated by a diode 116 and a capacitor 120 may be about 0.8V but actually becomes 3.2V because of a 3.2V power supply applied via the three-terminal regulator 150 and the diode 151.

(Steady state)

The following will describe operations in the steady state.

To enter a printing state, the engine controller 200 sets the VCHG port High to turn ON the transistor 153 in order to conduct the resistor 152, thus immediately returning the voltage Vcc1 value to 24V. At the same time, it sets the RLDR port High to turn ON the transistor 301, thus closing the relay 300.

Then, at predetermined timing, the engine controller 200 drives the printer engine and controls the engine itself and a quantity of electrification to the heater, thus permitting printing.

The engine controller 200, however, must be provided with the three ports of RLDR, FCHG, and VCHG, so that it needs to have circuits corresponding to these ports.

This leads to increases in the number of engine controller ports for power supply control in the sleep state and the number of the circuit components, accompanied by various problems of an enlarged apparatus size and an increased cost due to increases in the packaging surface area.

SUMMARY OF THE INVENTION

In view of the above, it is an object of the present invention to provide an image processing apparatus, an image recording apparatus, a method for controlling the same, and a power supply apparatus used in the same which can save on power dissipation in the wait state while reducing the number of parts required, the packaging surface area, and the apparatus size.

It is another object of the present invention to provide an inexpensive and small-sized image processing apparatus, image recording apparatus, and power supply apparatus used therein by decreasing the number of ports of the engine controller and the number of its components.

An image recording apparatus related to the present invention comprises: image recording controlling means for controlling image recording operations; a multiple-output power supply having plural converters for generating a driving voltage for image recording from an external power supply; and cutting-off means for cutting off supplying power from the above-described external power supply, wherein according to a cutting-off signal sent from the above-described image recording controlling means, the operating power for at least one of the above-described converters is cut off by the above-described cutting-off means.

Another image recording apparatus related to the present invention comprises: image recording controlling means for controlling image recording operations; a multiple-output power supply having plural converters for generating a driving voltage for image recording from an external power supply; and cutting-off means for cutting off supplying of power from the above-described external power supply, wherein according to a cutting-off signal sent from the above-described image recording controlling means, at least one of the above-described converters is stopped in operation by the above-described cutting-off means.

An image recording apparatus controlling method related to the present invention controls still another image recording apparatus related to the present invention comprising: image recording controlling means for controlling image recording operations; a multiple-output power supply having plural converters for generating a driving voltage for image recording from an external power supply; and cutting-off means for cutting off supplying of power from the above-described external power supply, wherein according to a cutting-off signal sent from the above-described image recording controlling means, operating power for at least one of the above-described converters is cut off by the above-described cutting-off means.

In the above-described image recording apparatus, preferably, operating power for the converter which feeds a driving voltage to the fixing device is cut off by the above-described cutting-off means.

Another embodiment of the present invention is directed to an image recording apparatus controlling method for controlling still another image recording apparatus comprising: image recording controlling means for controlling image recording operations; a multiple-output power supply having plural converters for generating a driving voltage for image recording from an external power supply; and cutting-off means for cutting off supplying of power from the above-described external power supply, wherein according to a cutting-off signal sent from the above-described image recording means, at least one of the above-described converters is stopped in operation by the above-described cutting-off means.

In the above-described image recording apparatus, preferably, operating power for the converter that feeds a driving voltage to the fixing device is cut off by the above-described cutting-off means.

The present invention provides an advantage of reducing a power loss in the wait state as well as a packaging surface area to decrease the apparatus size and its cost.

A power supply apparatus according to the present invention changes the power of a driving power supply based on frequency control. The apparatus includes power supply controlling means for controlling, in response to a change in the frequency, the power of the driving power supply generated by an external power supply; image processing controlling means for controlling an image processing apparatus to which power of the above-described driving power supply is supplied; and driving controlling means for changing the frequency of the above-described power supply controlling means according to a cutting-off controlling signal for cutting off the power supply which is output from the above-described image processing controlling means to the above-described image processing apparatus.

In this case, the above-described driving controlling means may change the above-described frequency of the above-described power supply controlling in a blocking manner.

The above-described driving controlling means may involve a wait operation whereby the above-described frequency is changed in a blocking manner and a steady operation whereby the above-described frequency is changed continuously.

The above-described driving controlling means may change the power supply voltage of the above-described driving power supply.

An image processing apparatus according to the present invention is supplied with power based on frequency control, and comprises the above-described power supply apparatus and image processing means for processing images using power with a controlled frequency fed out from that power supply apparatus.

The above-described image processing means may image recording means for recording images.

The above-described cutting-off controlling signal output from the above-described power supply apparatus can be output to fixing means of the above-described image recording means.

A method of power supply control according to the present invention actually changes the power of the driving power supply, and comprises the steps of: controlling the power of the driving power supply generated from the external power supply corresponding to a change in the frequency; controlling the image processing apparatus to which the power of the above-described driving power is supplied; and controlling the power supplied to the above-described driving power supply, by changing the above-described frequency.

A method for processing images according to the present invention actually processes images by supplying frequency-controlled power, and comprises the steps of: using the above-described power supply controlling method to output power which is changed according to frequency control; and processing images according to the output power.

According to the present invention, a power-supply cutting-off signal output from, for example the engine controller to a printer acts also as the frequency controlling signal, to change the frequency of the power supply control IC in order to vary a voltage value of the driving power supply, so that the cost due to an energy loss in the wait state can be reduced. Also, because the number of the ports of the engine controller can be reduced, the packaging surface area for the power supply apparatus can also be reduced to make the apparatus more compact.

According to the present invention, moreover, when the cutting-off means for cutting off the supply of power fed from an external power supply to a load is in a cut-off state, at least one of the outputs of a multiple-output power supply is inhibited. Therefore, by interrelating the controlling of the above-described load and the controlling for inhibiting the above-described at least one output of the power supply other than that load, the apparatus can be simplified in terms of configuration and control.

Other objects and features of the present invention will become apparent from the following detailed description and the attached drawings.

DESCRIPTION OF THE PREFERRED EMBODIMENTS

The following will describe embodiments of the present invention with reference to the accompanying drawings.

First Embodiment

Figure 4:
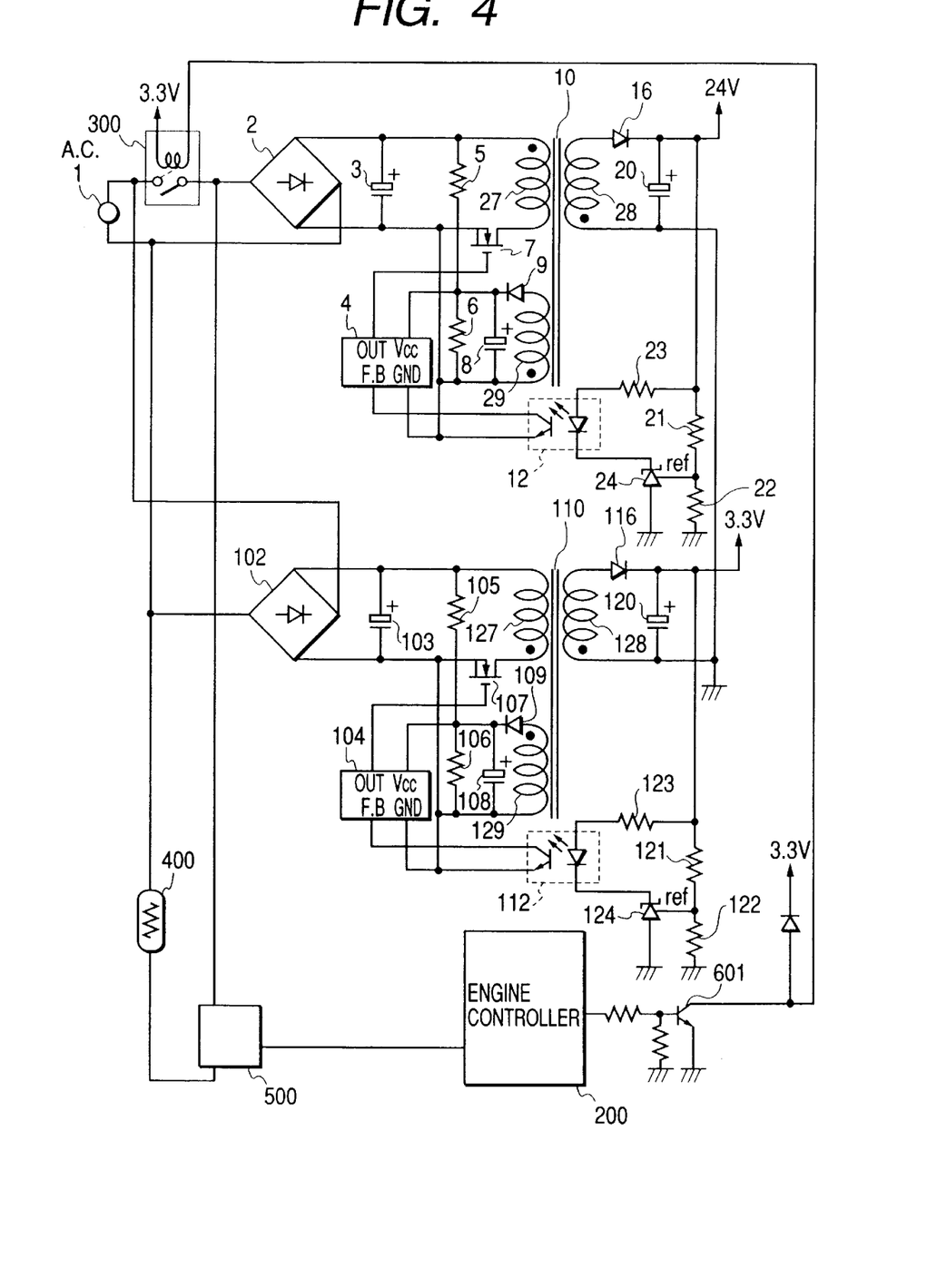
FIG. 4 is a circuit diagram showing a configuration of a first embodiment of the present invention.

FIG. 4 is a circuit diagram showing a configuration of a power supply circuit of an image recording apparatus according to a first embodiment of the present invention, in which the same reference numerals indicate the same components over FIGS. 1 and 4.

In the circuit of FIG. 4, the contact of the relay 300, which provides a power supply cutting-off means, is disposed on the AC power supply input line between the commercial AC power supply 1 and the diode bridge 2, in such a configuration that through itself, driving power is supplied from the triac 500 to the heating means (heater) 400 of a fixing device. To the lower-stage converter is supplied not through the relay 300 a direct current rectified at a diode bridge 102 and smoothed at a capacitor 103. The other configurations are the same as those of FIG. 1, so that their description is omitted here.

The apparatus of the above-described configuration comprises: a multiple-output power supply having plural (two in this case) converters for generating a driving voltage (AC voltage) used in recording of images from the commercial power supply 1, which is an external power supply; and the relay 300 as a means for cutting off the supply of power from the commercial AC power supply. In such a configuration, according to a cutting-off signal sent from the engine controller, which is an image recording controlling means for controlling image recording operations, supply of operating power is cut off by the above-described relay 300 to at least one of those converters. In this embodiment, the cutting-off signal sent from the engine controller turns ON the transistor 601 to activate the relay 300, in order to cut off power supply only to the upper-stage converter, thus stopping the converter operations.

Note here that in contrast to the circuit configuration of FIG. 1 where the relay 600 is independently provided for cutting off the 24V power supply, in this embodiment, the relay 300 for cutting off a driving voltage to the heating means of the fixing device is used also for that purpose.

With this, it is possible to suppress a power loss in the wait state and also reduce the number of the components and the packaging surface area, thus decreasing the apparatus size and the cost.

Furthermore, in this embodiment, wherein the engine controller 200 makes switchover to the energy-saving mode, in a constant lapse of time after the image recording apparatus enters the wait state, the relay 300 is opened to cut off power supply to the 24V power supply from the AC power supply 1.

In this embodiment, the relay 300 does not use as its power supply a 24V one but a 3.3V one or any other controlling power supply the voltage of which does not drop in the stand-by state, so that the apparatus may be restored from the energy-saving mode by the engine controller 200 when it closes the relay 300.

Thus, as compared to the circuit configuration example shown in FIG. 1, although the diode bridge 102 and the smoothing capacitor 103 are added to the 3.3V power supply, there is no need to provide a relay and a transistor for driving that relay, thus enabling reduction of the cost and the packaging surface area.

Furthermore, although in this embodiment has been described a method of using a relay to cut off a driving voltage for the heating means 400 of the image recording apparatus, any other means for cutting off the AC power supply 1 may also be used.

Second Embodiment

Figure 5:
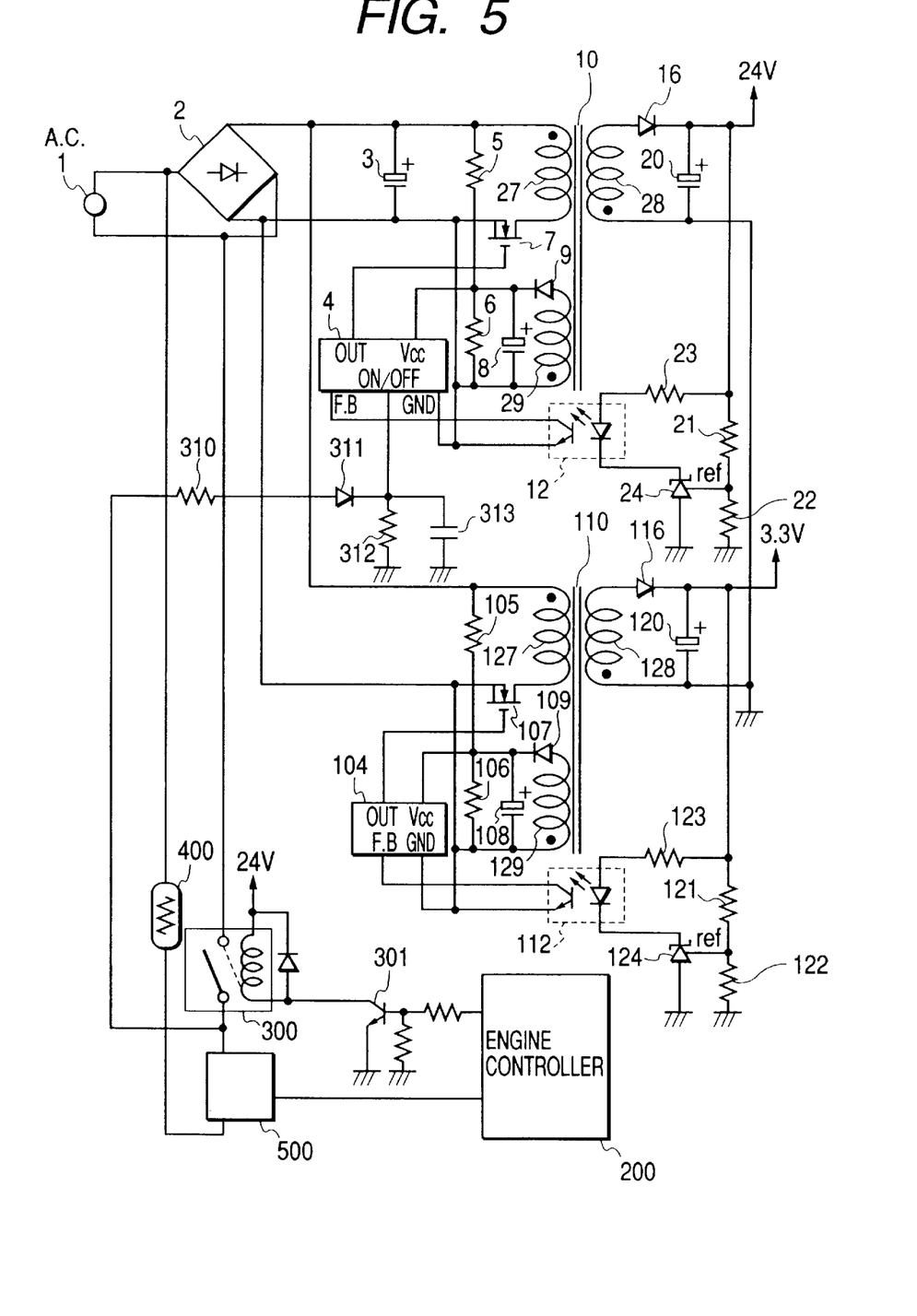
FIG. 5 is a circuit diagram showing a configuration of a second embodiment of the present invention.

FIG. 5 is a circuit diagram showing a second embodiment of the present invention, wherein the same reference numbers indicate the same components.

The driving circuit of the upper-stage converter in this embodiment comprises a power-supply controlling IC provided with an ON/OFF function, so that when its ON/OFF terminal is at the H level (higher than a constant voltage), the power-supply controlling IC is activated. When the ON/OFF terminal is at the L level (lower than the constant voltage), on the other hand, the power-supply controlling IC is deactivated.

In the above-described circuit, when printing, the engine controller closes the relay 300. In this case, the ON/OFF terminal of the power-supply controlling IC of the driving circuit 4 is set at the H level through the AC power supply 1, a resistor 310, a diode 311, a resistor 312, and a capacitor 313, thus starting the operations of the 24V power supply converter. Furthermore, in a certain lapse of time since the stand-by point in time, the engine controller 200 opens the relay 300. In this state, the ON/OFF terminal of the power-supply controlling IC of the driving circuit 4 is set at the L level, thus stopping the operations of the 24V power supply converter. Therefore, such a configuration has the same effects as the first embodiment.

Third Embodiment

Figure 6:
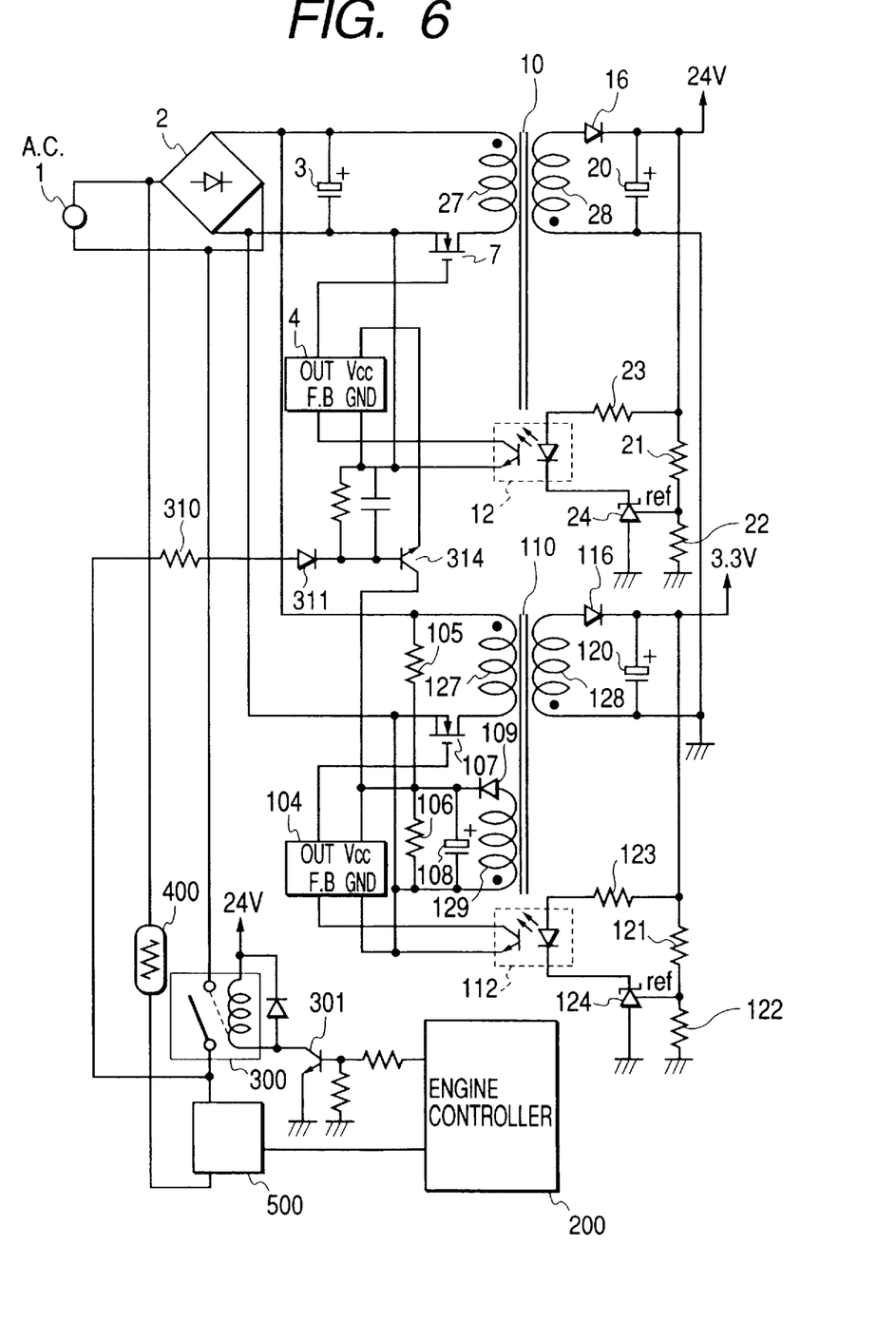
FIG. 6 is a circuit diagram showing a configuration of a third embodiment of the present invention.

FIG. 6 is a circuit diagram showing a third embodiment of the present invention, wherein the same reference numbers indicate the same components. Although in the above-described second embodiment, there has been explained such a case that the driving circuit 4 of the upper-stage converter comprises the power-supply controlling IC provided with the ON/OFF function, such a configuration that is show in FIG. 6 may be used not to supply power to the driving circuit 4. That is, by supplying a base current from the commercial power supply 1 through the relay 300, the resistor 310, and the diode 311 to a transistor 314, an operating voltage is supplied to the driving circuit 4 from the upper-stage converter. Such a configuration has the same effects as the second embodiment.

Although in the second and third embodiments, there has been explained such a configuration that the relay for cutting off the driving voltage for the heating means 400 of the image recording apparatus is turned ON/OFF to cut off the 24V power supply, any other configuration may be employed such that the 24V power supply can be cut off by a switching means such as a relay for cutting off the AC power supply when it is turned ON/OFF.

In this embodiment, the relay 300 does not use as its power supply a 24V one but a 3.3V one or any other controlling power supply (of a voltage not dropped in a stand-by state), so that the apparatus may be restored from the energy-saving mode when the engine controller 200 closes the relay 300.

Thus, as compared to the circuit configuration example of FIG. 1, although the diode 102 and the smoothing capacitor 103 are added to the 3.3V power supply, there is no need to provide a relay and a transistor for driving the relay, thus enabling reduction of the cost and the packaging surface area.

Furthermore, although in this embodiment, there has been explained an embodiment of realizing a function of cutting off the 24V power supply by using a relay for cutting off the driving voltage for the heating means 400 of the image recording apparatus, any other means may be used for cutting off the AC power supply 1 or, the relay 300 may use as its power supply, in place of a 24V one, a 3.3V one or any other controlling power supply (of a voltage not dropped in the stand-by state).

The following will describe embodiments of an apparatus which comprises power supply controlling means for controlling a voltage of a driving power supply (DC power supply) generated from the commercial power supply corresponding to a change in frequency and image recording controlling means for controlling the recording operations by the image recording apparatus, wherein based on a signal output from the image recording controlling means to the image recording apparatus, e.g. a cutting-off signal for cutting off the power supply, the frequency of the power supply controlling means is changed to vary the voltage value of the driving power supply.

Fourth Embodiment

A fourth embodiment is described with reference to FIGS. 7 and 8. The same components are indicated by the same reference numerals in FIGS. 1, 7 and 8, so that their description is omitted here.

Figure 7:
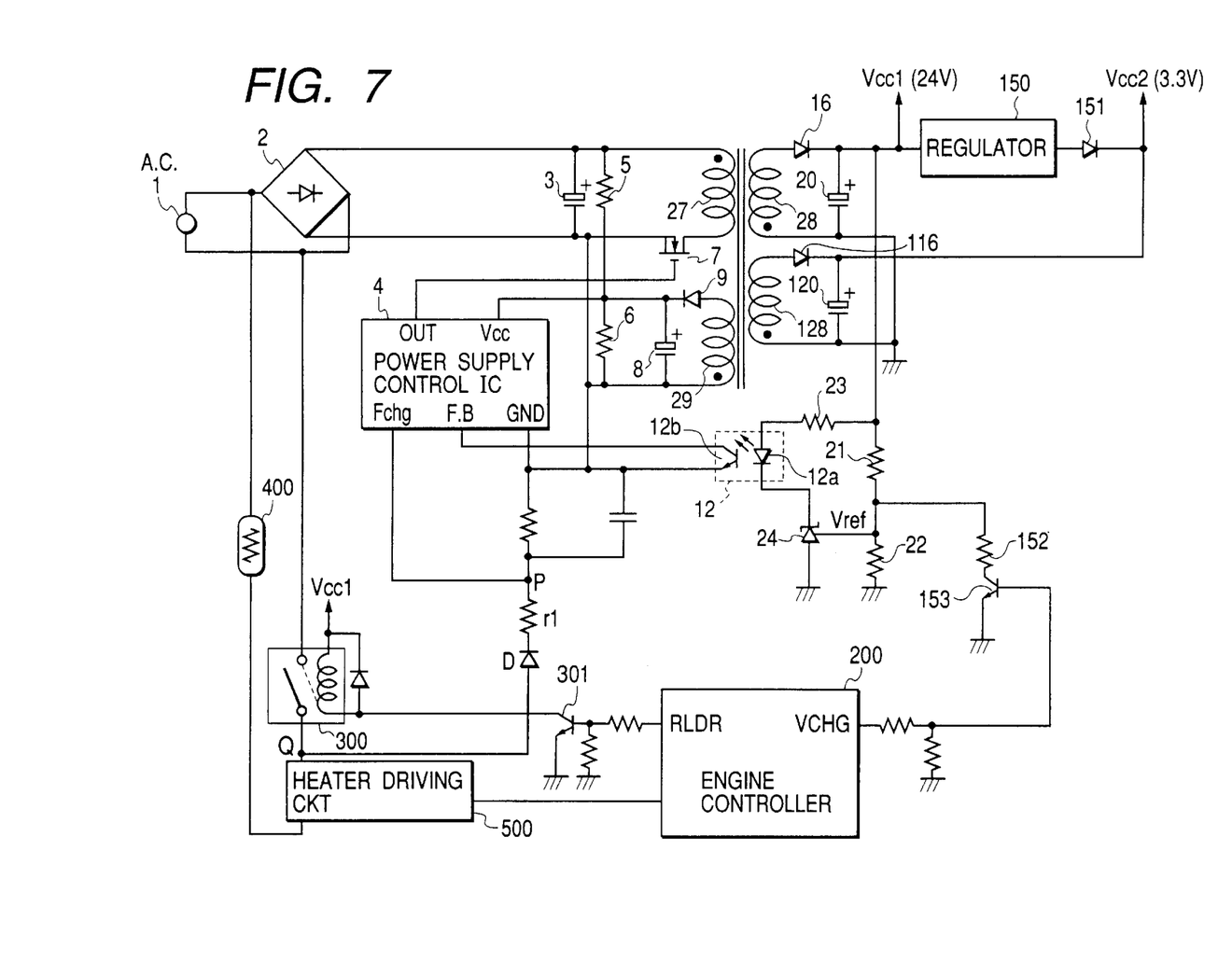
FIG. 7 is a circuit diagram showing a configuration of a power supply apparatus equipped to a printer according to a fourth embodiment of the present invention.
Figure 8:
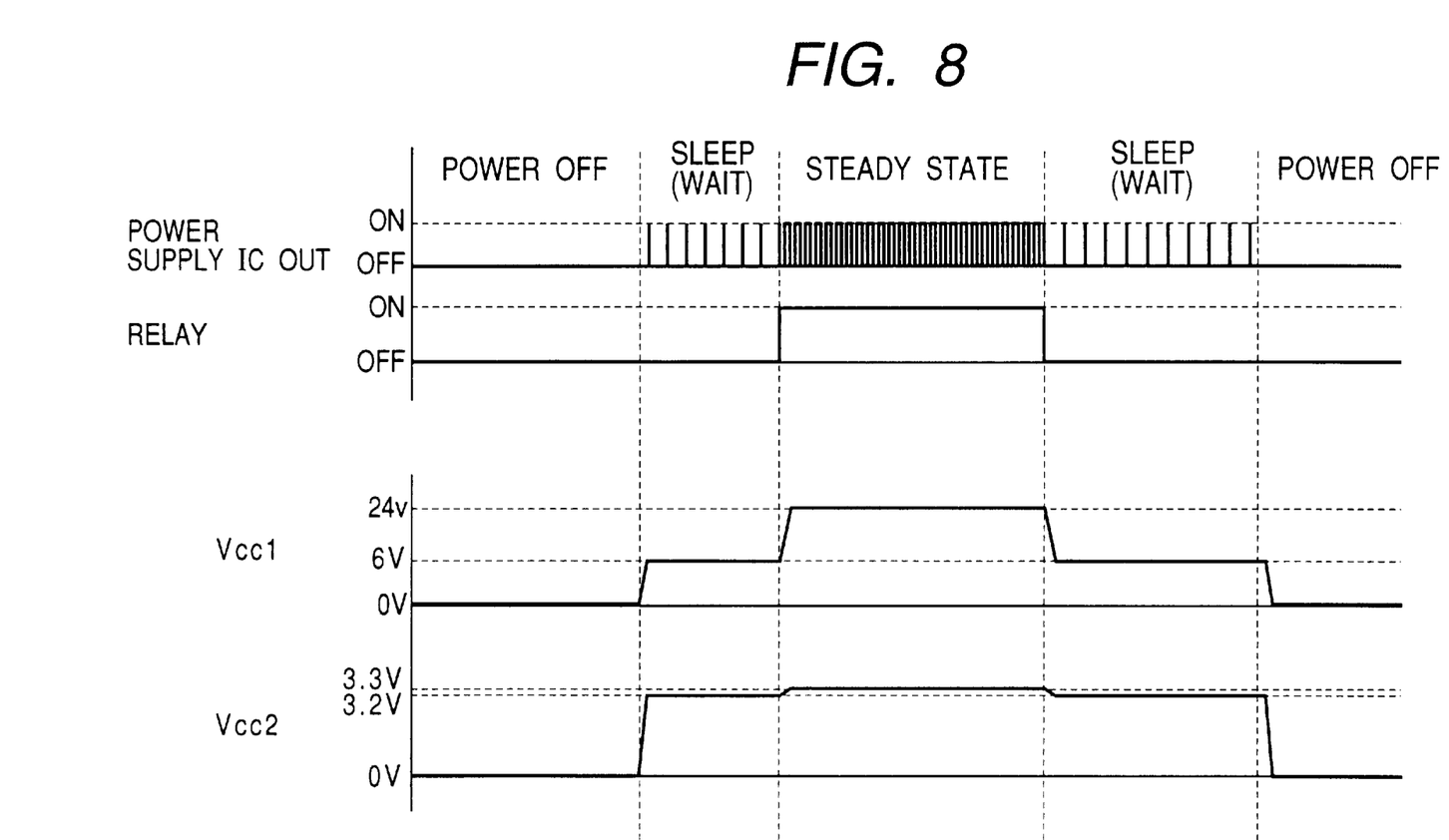
FIG. 8 is a timing chart explaining operation timing in a sleep state and a steady state of the power supply apparatus of FIG. 7.

FIG. 7 shows a circuit configuration of a power-supplying power supply built in a printer, an image processing apparatus related to the present invention.

(Basic configuration)

First, the basic configuration of this apparatus is described.

A reference numeral 1 indicates an AC power supply, an AC voltage of which is full-wave rectified at the diode bridge 2 and smoothed at the smoothing capacitor 3.

A reference numeral 4 indicates a power-supply controlling IC and is activated by power-supply controlling IC staring resistors 5 and 6.

After power application, the power supply controlling IC 4 turns ON/OFF an FET 7. When the FET 7 is ON, a voltage is applied to a main winding 27 and a transformer accumulates power therein.

When the power supply is turned OFF, energy accumulated at the transformer is released to an auxiliary winding 29, a secondary winding 28, and a winding 128.

Energy released from the auxiliary winding 29 is smoothed at the diode 9 and the capacitor 8, thus providing an auxiliary power supply for the power supply controlling IC 4 after power application.

Energy released from the secondary winding 28 is smoothed by the diode 16 and the capacitor 20.

A reference numeral 24 indicates a shunt regulator and flows a current from the cathode to the anode so that a value obtained by dividing the voltage Vcc1 by the feedback resistors 21 and 22, the resistor 152, and the transistor 153 may be equal to the reference voltage Vref of the shunt regulator 24. A reference numeral indicates a power supply controlling resistor.

A reference numeral 12 indicates a photo-coupler. When a current flows through the light emitting sections 12a of the photo-coupler 12, the light receiving section 12b in turned ON, thus permitting a current to flow out of the F.B section of the power supply controlling IC 4.

According to this current, the power supply controlling IC 4 controls a duty ratio, thus stabilizing the power supply.

A reference numeral 150 indicates a three-terminal regulator, to which generally the voltage Vcc1 (24V) is applied and is then converted to a voltage of Vcc2+0.6V (3.9V) approximately. Then, it is applied through the diode 151 to the power supply Vcc2 (3.3V).

In the steady state, voltage output from the regulator 150 is designed to be Vcc2−0.1V (3.2V), lower than the voltage Vcc2 (3.3V) generated by the diode 116 and the capacitor 120. The reason for this is to prevent a regulator loss by flowing no current from the regulator in the steady state.

A reference numeral 300 indicates a relay and acts as a breaker which prevents an AC voltage from being applied to the heater 400 if the heater 400 or the heater driving circuit 500 fails.

The heater 400 is a means for fixing toner transferred onto paper in the electrophotographing process and used to constitute a fixing device for a printer. The heater driving circuit 500 is used to energize the fixing device.
(Configuration of main part)

A reference numeral 200 indicates the engine controller. This engine controller 200 has two ports of the RLDR port and the VCH port.

The following will describe the configuration of the main part related to the present invention. to which the corresponding control circuits are connected respectively.

In this configuration, at the power supply controlling IC 4, which is the control circuit for the RLDR port, a contact point P between the FCHG port and the GND port is connected via the resistor r1 and a diode D to a point Q on one end side of the relay 300.

The engine controller 200 drives the printer engine, controls the engine and the heater driving circuit 500 for controlling a quantity of electrification to the heater 400 and the relay 300, and also controls frequency conversion for the power supply controlling IC 4.

That is, the engine controller 200 sets the RLDR port High/Low to turn the transistor 301 ON/OFF in order to open and close the relay 300 and, at the same time, changes a voltage level at the point Q to turn the diode ON/OFF in order to change a voltage level at the point P, thus controlling frequency conversion for the power supply controlling IC 4 in the sleep state.

Thus, this embodiment features a respect that the signal for frequency conversion for the power supply controlling IC 4 in the sleep state acts also as the cutting-off signal for operating the cutting-off relay 300 on the side of the heater 400.
(Circuit operations)

The following will describe the circuit operations n of this apparatus.

In this embodiment, the engine controller 200 conducts various control operations in the sleep and wait states.
(Sleep state)

The following will describe the operations in the sleep state.

When the engine controller 200 switches to the sleep mode, the printer enters the wait state and, in a certain lapse of time, the RLDR port is set Low.

With this, the transistor 301 is turned OFF and the relay 300 is opened and the FCHG port of the power supply controlling IC 4 is set Low. As a result, as shown in FIG. 8, as compared to the steady state, in the sleep state, the frequency of the power supply controlling IC 4 is decreased. Since the power supply controlling IC 4 is in such an aspect that some pulses are removed from a pulse string output in a Low state as compared to a pulse string output in a High state by the FCHG port, it is called a blocking operation in this specification. Even aside from such an aspect, however, the present invention can be embodied as far as the frequency output in a Low state is lower than that output in a High state by the FCHG port. Furthermore, even when the frequency output in a High state is equal to that output in a Low state by the FCHG port, a pulse string may be output in a Low state in a blocking manner.

Also at the same time, the engine controller 200 sets the VCHG port at Low, turns the transistor 153 OFF, and makes the resistor 152 nonconductive, to set the voltage Vcc1 at 6V.
(Steady state)

The following will describe the circuit operations for printing in the steady state.

For printing, the engine controller 200 sets the VCHG port High, turns the transistor 153 ON, and makes the resistor 152 conductive, to set the voltage Vcc1 at 24V.

Then, the engine controller 200 sets the RLDR port High, turns the transistor 301 ON, and closes the relay 300. With this, the diode D is turned ON to raise the voltage level at the point P, thus setting the FCHG port of the power supply controlling IC 4 High. As a result, as shown in FIG. 2, the frequency of the power supply controlling IC 4 is decreased as compared to that in the sleep state.

As described above, since this embodiment, in contrast to the prior-art examples, has no FCHG port or separate controlling circuits (photo-coupler 112 etc.) connected to that port, it is possible to reduce the number of photo-couplers and ports of the engine controller 200, thus reducing the cost and the packaging surface area.

Fifth Embodiment

Figure 9:
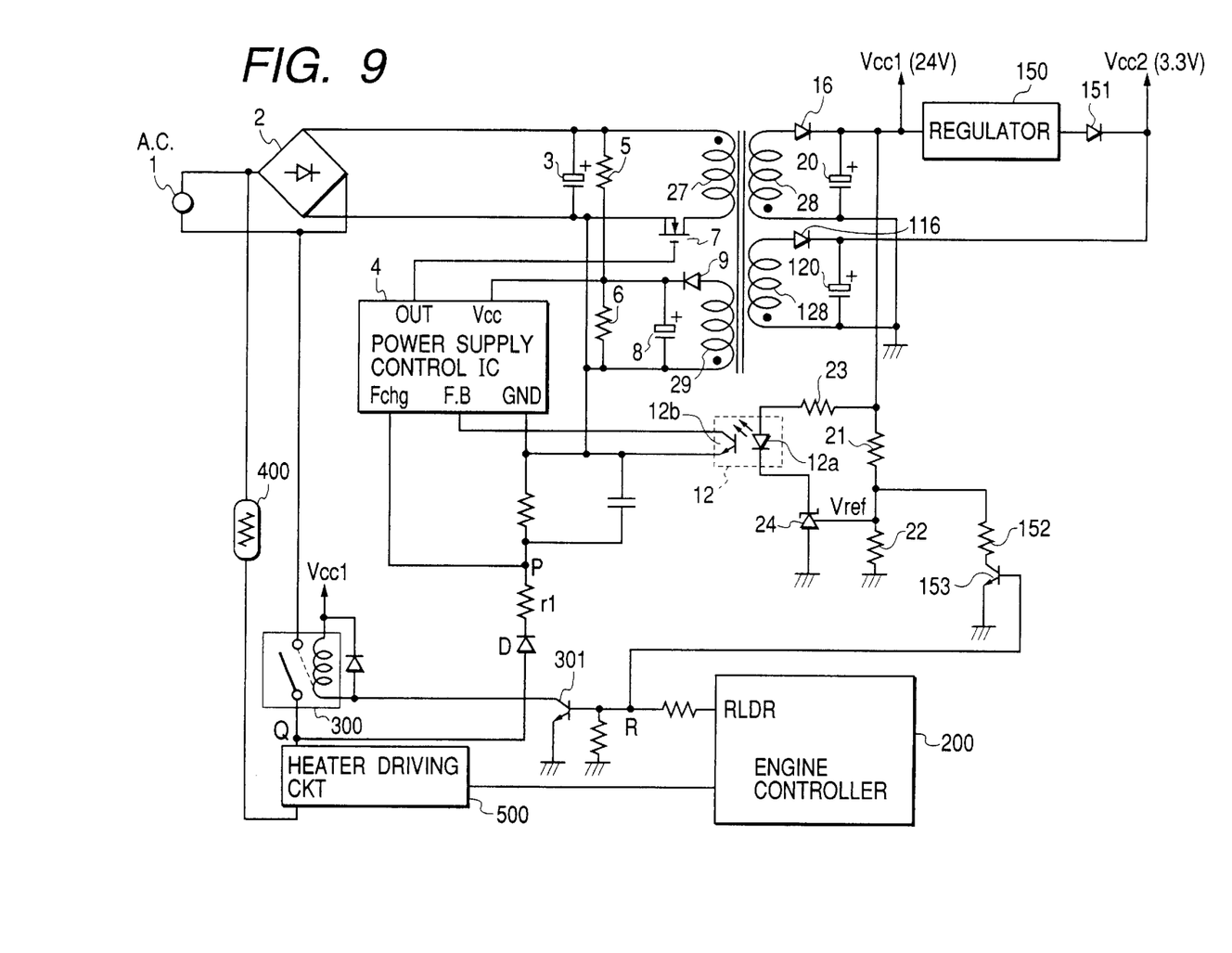
FIG. 9 is a circuit diagram showing a configuration of a power supply apparatus equipped to a printer according to a fifth embodiment of the present invention.

The following will describe a fifth embodiment of the present invention with reference to FIG. 9. The same components as those in FIG. 4 are indicated by the same reference numerals and so their description is omitted here.

This embodiment features a respect that variations in the frequency and the voltage of the power supply controlling IC 4 are controlled by the same port.

The engine controller 200 is provided only one port, i.e. the RLDR port, to which various corresponding control circuits are connected.

In this configuration, to a contact point on the side of the RLDR port is connected the base of the transistor 153.

With this, the engine controller 200 drives the printer engine, controls the engine, the heater driving circuit 500 for controlling a quantity of electrification to the heater 400, the relay 300, and frequency conversion for the power supply controlling IC 4 described above in the fourth embodiment, and also controls the driving voltage.

(Sleep state)

The following will describe the operations in the sleep state.

When the engine controller 200 switches to the sleep mode, the printer enters the wait state and, in a certain lapse of time, the RLDR port is set Low.

With this, the transistor 301 is turned OFF and the relay 300 is opened, so that the FCHG port of the power supply controlling IC 4 is set Low, so that as described above with reference to FIG. 8, the frequency of the power supply controlling IC 4 is decreased.

Furthermore, at the same time when the RLDR port is set Low, the transistor 153 is turned OFF and the resistor 512 is made nonconductive, to set the voltage Vcc1 at 6V.

(Steady state)

The following will describe the circuit operations of printing in the steady state.

For printing, the engine controller 200 sets the RLDR port High, turns the transistor 513 ON, and makes the resistor 152 conductive, to set the voltage Vcc1 at 24V.

Furthermore, at the same time, the transistor 301 is turned ON and the relay 300 is closed. With this, the FCHG port of the power supply controlling IC 4 is set High, so that the frequency of the power supply controlling IC 4 is increased.

Although in this embodiment, the port for controlling variations in the driving voltage is supposed to be the relay 300, it is not limited to that but any other port such as a fan may be used to have the same effects.

Furthermore, although in the fourth and fifth embodiments such an example has been explained that the conversion signal for controlling the frequency of the power supply controlling IC 4 is used also as the cutting-off signal for the heater 400 in the printer, any other control signal, for example a signal for cutting off the AC power supply 1, may also be used for that purpose.

Although in the above-described embodiments a flyback type multiple-output power supply has been explained, any other type may provide almost the same control such as a forward power supply, a resonant power supply, a series dropper, or a ringing chalk converter.

Furthermore, in this embodiment, the relay 300, etc. are controlled in operation according to instructions sent from the ports of the engine controller 200 in the printer, and an external host computer connected to the printer may send such instructions.

Moreover, the present invention may be applicable to a system comprising plural apparatuses (e.g., host computer, interface devices, reader, printer, etc.) or a single apparatus (e.g., copy machine, facsimile, etc.).

In addition, the present invention can of course be achieved by supplying a program to the system or the apparatus. Furthermore, the effects of the present invention can be enjoyed by supplying a memory medium storing programs represented by the software for achieving the present invention, to a system or an apparatus so that its computer (i.e., CPU or MPU) may read out the program code stored in that memory medium and then execute it.

In this case, the program code itself read out from the memory medium achieves the functions of the above-described embodiments, so that the memory medium storing that program code achieves the present invention.

The memory medium storing the program code comes in, for example, a floppy disk, a hard disk, an optical disk, a magneto-optical disk, a CD-ROM, a CD-R, a magnetic tape, a nonvolatile memory card, or a ROM (mask ROM, flash EEPROM, etc.).

Furthermore, such a case is of course included in the present invention that by executing the program code read out by the computer, not only the functions of the above-described embodiments are achieved but also the OS (Operating System) running in the computer can execute part or all of the actual processing according to the instructions of that program code, thus achieving those functions of the above-described embodiments.

Moreover, such a case is of course included in the present invention that the program code read out from the memory medium is written into a memory equipped to a function-expansion board inserted into the computer or a function-expansion unit connected to the computer, so that according to the instruction of that program code, the CPU of that function-expansion board or the function-expansion unit may execute part or all of the actual processing, thus achieving the functions of the above-described embodiments.

What is claimed is:

1. An apparatus comprising:
   DC power supply means for generating plural DC voltages from a power supplied from an AC power source, said DC power supply means comprising at least one transformer;
   a load different from said DC power supply means, which is supplied with a power from the AC power source;
   cutting-off means for cutting off the supply of power at least to the load from the AC power source in accordance with a control signal, the control signal being electrically separated from a primary side of said transformer; and
   main control means for outputting the control signal to said cutting-off means,
   wherein, when said cutting-off means is in a cut-off state, one output of the plural DC voltages is stopped without providing means, other than said cutting-off means, for electrically separating the control signal from the primary side of said transformer.

2. An apparatus according to claim 1, wherein
   said DC power supply means has first means for generating a first DC power supply voltage and second means for generating a second DC power supply voltage, and
   said cutting-off means cuts off the supply of power to both said load and said first means.

3. An apparatus according to claim 1, wherein said power supply means has first means for generating a first DC power supply voltage and second means for generating a second DC power supply voltage, and said apparatus comprises first and second controlling means for controlling said first and second means,
   wherein the first DC power supply voltage is stopped according to an operating state of said cutting-off means.

4. An apparatus according to claim 3, wherein said first controlling means is supplied with power via a power supply line cut off by said cutting-off means, so that the first DC power supply voltage is stopped when said cutting-off means is in the cut-off state.

5. An apparatus according to claim 1, wherein said DC power supply means has at least one controlling means for controlling a primary side of said transformer at a predetermined frequency in such a way that at least one of the plural DC voltages generated by said DC power supply means may be equal to a predetermined voltage in a conducting state of said cutting-off means.

6. An apparatus according to claim 1, wherein said DC power supply means comprises plural transformers and controlling means for controlling a primary side of said transformers at a predetermined frequency in such a way that the plural DC voltages generated by said DC power supply means may be equal to predetermined voltages respectively in a conducting state of said cutting-off means.

7. An apparatus according to claim 1, wherein said DC power supply means has a transformer and controlling means for controlling a primary side of the transformer at a predetermined frequency in such a way that one of the plural DC voltages generated by said DC power supply means may be equal to a first predetermined voltage in a conducting state of said cutting-off means, and said controlling means is controlled by a signal via a power supply line cut off by said cutting-off means.

8. An apparatus according to claim 7, wherein said transformer has first and second secondary windings, and generates first and second DC voltages by respectively rectifying outputs of said first and second secondary windings.

9. An apparatus according to claim 8, further comprising a regulator for regulating the first DC voltage to approximately the value of the second DC voltage, wherein, on the basis of the signal via a power supply line cut off by said cutting-off means, said controlling means intermittently drives a primary side of said transformer in such a way that one of the plural DC voltages generated by said DC power supply means may be equal to a second predetermined voltage in a cut-off state of said cutting-off means, so that the output obtained by rectifying said first secondary winding is supplied as the second DC voltage via said regulator in a cut-off state of said cutting-off means.

10. An apparatus according to claim 9, further comprising specifying means for specifying either said first predetermined voltage or said second predetermined voltage on the basis of the control signal or another control signal output by said main control means.

11. An apparatus according to claim 1, wherein said apparatus is an image recording apparatus for forming a toner image on a recording medium in an electrostatic recording method, and said load is a fixation heater for fixing the formed toner image onto the recording medium.

12. An apparatus according to claim 11, wherein said DC power supply means comprises first means for generating a first DC power supply voltage and second means for generating a second DC power supply voltage, and said cutting-off means cuts off the supply of power to both said load and said first means.

13. An apparatus according to claim 11, wherein said power supply means has first means for generating a first DC power supply voltage and second means for generating a second DC power supply voltage, and said apparatus comprises first and second controlling means for controlling said first and second means, wherein the first DC power supply voltage is stopped according to an operating state of said cutting-off means.

14. An apparatus according to claim 13, wherein said first controlling means is supplied with power via a power supply line cut off by said cutting-off means, so that the first DC power supply voltage is stopped when said cutting-off means is in the cut-off state.

15. An apparatus according to claim 11, wherein said DC power supply means has at least one controlling means for controlling a primary side of said transformer at a predetermined frequency in such a way that at least one of the plural DC voltages generated by said DC power supply means may be equal to a predetermined voltage in a conducting state of said cutting-off means.

16. An apparatus according to claim 11, wherein said DC power supply means has plural transformers and plural controlling means, each of the plural controlling means controls a primary side of a corresponding transformer at a predetermined frequency in such a way that the plural DC voltages generated by said DC power supply means may be equal to predetermined voltages, respectively, in a conducting state of said cutting-off means.

17. An apparatus according to claim 11, wherein said DC power supply means has controlling means for controlling a primary side of said transformer at a predetermined frequency in such a way that one of the plural DC voltages generated by said DC power supply means may be equal to a first predetermined voltage in a conducting state of said cutting-off means, and said controlling means is controlled by a signal via a power supply line cut off by said cutting-off means.

18. An apparatus according to claim 17, wherein said transformer has first and second secondary windings, and generates first and second DC voltages by respectively rectifying outputs of said first and second secondary windings.

19. An apparatus according to claim 18, further comprising a regulator for regulating the first DC voltage to approximately the value of the second DC voltage, wherein, on the basis of the signal via a power supply line cut off by said cutting-off means, said controlling means intermittently drives a primary side of said transformer in such a way that one of the plural DC voltages generated by said DC power supply means may be equal to a second predetermined voltage in a cut-off state of said cutting-off means, so that the output obtained by rectifying said first secondary winding is supplied as the second DC voltage via said regulator in a cut-off state of said cutting-off means.

20. An apparatus according to claim 19, further comprising specifying means for specifying either the first predetermined voltage or the second predetermined voltage on the basis of the control signal or another control signal output by said main control means.

* * * * *

UNITED STATES PATENT AND TRADEMARK OFFICE
CERTIFICATE OF CORRECTION

PATENT NO. : 6,408,148 B1
DATED : June 18, 2002
INVENTOR(S) : Yamamoto

It is certified that error appears in the above-identified patent and that said Letters Patent is hereby corrected as shown below:

Column 8,
Line 1, "show" should read -- shown --.

Column 10,
Line 3, "a respect" should read -- an aspect --;
Line 8, "n" should be deleted; and
Line 16, "in a certain" should read -- after a certain --.

Signed and Sealed this

Fourth Day of February, 2003

JAMES E. ROGAN
*Director of the United States Patent and Trademark Office*